United States Patent [19]

Green et al.

[11] Patent Number: 4,683,567

[45] Date of Patent: * Jul. 28, 1987

[54] ASYNCHRONOUS SIGNALING SYSTEM FOR DIGITAL COMMUNICATION CHANNEL

[75] Inventors: Michael J. Green; James B. McKay, both of Coquitlam, Canada

[73] Assignee: British Columbia Telephone Company, Burnaby, Canada

[*] Notice: The portion of the term of this patent subsequent to Jun. 16, 2004 has been disclaimed.

[21] Appl. No.: 760,717

[22] Filed: Jul. 30, 1985

[51] Int. Cl.⁴ .............................................. H04J 3/12
[52] U.S. Cl. ................................................ 370/110.1
[58] Field of Search ................... 370/110.1, 100, 106, 370/105, 91; 179/84 SS, 84 VF

[56] References Cited

U.S. PATENT DOCUMENTS

| | | | |
|---|---|---|---|
| 4,430,733 | 2/1984 | Hardy et al. | 370/110.1 |
| 4,593,389 | 6/1986 | Wurzburg et al. | 370/110.1 |
| 4,596,021 | 6/1986 | Carter et al. | 370/110.1 |

Primary Examiner—Douglas W. Olms
Assistant Examiner—Wellington Chin
Attorney, Agent, or Firm—Douglas M. Gilbert; Russell A. Cannon

[57] ABSTRACT

A selected one of a plurality of unique N-bit digital code words that corresponds to an associated signaling message is continuously transmitted until it is desired to transmit a different signaling message. Decoder logic in the receiver looks at a new group of N-signaling bits during each signaling bit interval, without reference to the start of a transmitted code word, and makes a decision during each signaling bit interval as to what signaling message was transmitted. In this manner a keep-alive signal is virtually continuously provided in the receiver. Latch circuitry repeats the previous decision from the decoder logic when the current group of N-signaling bits does not correspond to one of the unique code words or an ordered permutation thereof. In an alternate embodiment a memory circuit requires that the decoder logic repeat the same decision as to what signaling message was transmitted for P consecutive groups of N-signaling bits (i.e., for P consecutive signaling bit intervals) before the latch circuit will indicate that a different signaling message is being transmitted.

11 Claims, 12 Drawing Figures

| SIGNALING STATE | PRIMARY CODE WORDS | PRIMARY AND SECONDARY CODE WORDS |
|---|---|---|
| S1 | S11 = 000001 | S11 = 000001<br>S12 = 000010<br>S13 = 000100<br>S14 = 001000<br>S15 = 010000<br>S16 = 100000 |
| S2 | S21 = 000111 | S21 = 000111<br>S22 = 001110<br>S23 = 011100<br>S24 = 111000<br>S25 = 110001<br>S26 = 100011 |
| S3 | S31 = 011111 | S31 = 011111<br>S32 = 111110<br>S33 = 111101<br>S34 = 111011<br>S35 = 110111<br>S36 = 101111 |
| S4 | S41 = 101100 | S41 = 101100<br>S42 = 011001<br>S43 = 110010<br>S44 = 100101<br>S45 = 001011<br>S46 = 010110 |
| S5 | S51 = 010011 | S51 = 010011<br>S52 = 100110<br>S53 = 001101<br>S54 = 011010<br>S55 = 110100<br>S56 = 101001 |

RECEIVER OPERATION FOR CONVERTER 23
SWITCHING FROM S31 TO S41 CODE WORD AT END OF S31.

TRANSMIT SEQUENCE:
```
B1 .... BN      BN+1 .... B2N
0 1 1 1 1 1     1 0 1 1 0 0
    S31             S41
```

| SIGNALING INTERVAL | CONTENTS OF REGISTER 45 B1  B6 | B7 B12 | LOGIC CIRCUIT 55 DESIGNATION OF SIGNALING STATE | LATCH CIRCUIT 65 DESIGNATION OF SIGNATLING STATE |
|---|---|---|---|---|
| t=0 | 011111 | 101100 | S3 | S3 |
| t=1 | 11111 | 1 | ∅ | $\overline{S3}$ |
| t=2 | 1111 | 10 | S3 | S3 |
| t=3 | 111 | 101 | S3 | S3 |
| t=4 | 11 | 1011 | S3 | S3 |
| t=5 | 1 | 10110 | ∅ | $\overline{S3}$ |
| t=6 |  | 101100 | S4 | S4 |

∅ = INVALID N-BIT WORD IN REGISTER 45 e.g., $\overline{S3}$ INDICATES START OF A LATCHED OPERATION

FIG. 5

POSSIBLE TRANSIENT SEQUENCES IN
SWITCHING FROM SIGNALING STATE S3 TO S4

| SIGNALING STATES | TRANSMITTED CODE WORDS | | LOGIC CIRCUIT 55 OUTPUT SEQUENCE | | | | | | | LATCH CIRCUIT 65 OUTPUT SEQUENCE | | | | | | |
|---|---|---|---|---|---|---|---|---|---|---|---|---|---|---|---|---|
| | S3 | S41 | Signaling Interval t=0 | 1 | 2 | 3 | 4 | 5 | 6 | t=0 | 1 | 2 | 3 | 4 | 5 | 6 |
| S31 S41 | 011111 | 101100 | S3 | ∅ | 3 | 3 | 3 | ∅ | 4 | S3 | $\overline{3}$ | 3 | 3 | 3 | $\overline{3}$ | 4 |
| S32 S41 | 111110 | 101100 | S3 | 3 | ∅ | ∅ | ∅ | 4 | 4 | S3 | 3 | $\overline{3}$ | $\overline{3}$ | $\overline{3}$ | 4 | 4 |
| S33 S41 | 111101 | 101100 | S3 | 3 | ∅ | ∅ | ∅ | ∅ | 4 | S3 | 3 | $\overline{3}$ | $\overline{3}$ | $\overline{3}$ | $\overline{3}$ | 4 |
| S34 S41 | 111011 | 101100 | S3 | 3 | ∅ | ∅ | 3 | ∅ | 4 | S3 | 3 | $\overline{3}$ | $\overline{3}$ | 3 | $\overline{3}$ | 4 |
| S35 S41 | 110111 | 101100 | S3 | 3 | ∅ | 3 | 3 | ∅ | 4 | S3 | 3 | $\overline{3}$ | 3 | 3 | $\overline{3}$ | 4 |
| S36 S41 | 101111 | 101100 | S3 | 3 | 3 | 3 | 3 | ∅ | 4 | S3 | 3 | 3 | 3 | 3 | $\overline{3}$ | 4 |

∅ = INVALID N-BIT WORD IN REGISTER 45 e.g., $\overline{S3} = \overline{3}$ INDICATES START OF A LATCHED OPERATION

FIG. 6

RECEIVER OPERATION FOR CONVERTER 23
SWITCHING FROM S41 TO S31 CODE WORD AT END OF S41

TRANSMIT SEQUENCE:
```
    B1 .... BN    BN+1 .... B2N
    1 0 1 1 0 0   0 1 1 1 1 1
    ⎵⎵⎵⎵⎵⎵⎵⎵⎵     ⎵⎵⎵⎵⎵⎵⎵⎵⎵
       S41            S31
```

| SIGNALING INTERVAL | CONTENTS OF REGISTER 45 B1  B6 | B7 B12 | LOGIC CIRCUIT 55 DESIGNATION OF SIGNALING STATE | LATCH CIRCUIT 65 DESIGNATION OF SIGNATLING STATE |
|---|---|---|---|---|
| t=0 | 101100 | 011111 | S4 | S4 |
| t=1 | 01100 | 0 | ∅ | $\overline{S4}$ |
| t=2 | 1100 | 01 | S2 | S2 |
| t=3 | 100 | 011 | S2 | S2 |
| t=4 | 00 | 0111 | S2 | S2 |
| t=5 | 0 | 01111 | ∅ | $\overline{S2}$ |
| t=6 |  | 011111 | S3 | S3 |

∅ = INVALID N-BIT WORD IN REGISTER 45 e.g., $\overline{S4}$ INDICATES START OF A LATCHED OPERATION

FIG. 7

POSSIBLE TRANSIENT SEQUENCES IN
SWITCHING FROM SIGNALING STATE S4 TO S3

| SIGNALING STATES | TRANSMITTED CODE WORDS | | LOGIC CIRCUIT 55 OUTPUT SEQUENCE | | | | | | | LATCH CIRCUIT 65 OUTPUT SEQUENCE | | | | | | |
|---|---|---|---|---|---|---|---|---|---|---|---|---|---|---|---|---|
| | S4 | S31 | Signaling Interval t=0 | 1 | 2 | 3 | 4 | 5 | 6 | t=0 | 1 | 2 | 3 | 4 | 5 | 6 |
| S41 S31 | 101100 | 011111 | S4 | ∅ | 2 | 2 | 2 | ∅ | 3 | 4 | $\overline{4}$ | 2 | 2 | 2 | $\overline{2}$ | 3 |
| S42 S31 | 011001 | 011111 | S4 | 4 | 4 | 4 | ∅ | 3 | 3 | 4 | 4 | 4 | 4 | $\overline{4}$ | 3 | 3 |
| S43 S31 | 110010 | 011111 | S4 | ∅ | ∅ | 5 | ∅ | ∅ | 3 | 4 | $\overline{4}$ | $\overline{4}$ | 5 | $\overline{5}$ | $\overline{5}$ | 3 |
| S44 S31 | 100101 | 011111 | S4 | ∅ | ∅ | ∅ | ∅ | 3 | 3 | 4 | $\overline{4}$ | $\overline{4}$ | $\overline{4}$ | $\overline{4}$ | 3 | 3 |
| S45 S31 | 001011 | 011111 | S4 | 4 | ∅ | ∅ | 3 | 3 | 3 | 4 | 4 | $\overline{4}$ | $\overline{4}$ | 3 | 3 | 3 |
| S46 S31 | 010110 | 011111 | S4 | 4 | 4 | ∅ | ∅ | ∅ | 3 | 4 | 4 | 4 | $\overline{4}$ | $\overline{4}$ | $\overline{4}$ | 3 |

∅ = INVALID N-BIT WORD IN REGISTER 45 e.g., $\overline{S4}$ = $\overline{4}$ INDICATES START OF A LATCHED OPERATION

RECEIVER OPERATION FOR CONVERTER 23
SWITCHING FROM S41 TO S31 CODE WORD AT END OF S41

| SIGNALING INTERVAL | CONTENTS OF REGISTER 45 B1 B6 | B7 B12 | LOGIC CIRCUIT 55 DESIGNATION OF SIGNALING STATE | LATCH CIRCUIT 65 DESIGNATION OF SIGNALING STATE | |
|---|---|---|---|---|---|
| | S41 | S31 | | | |
| t=0 | 101100 | 011111 | S4 | S4 | 4 |
| t=1 | 01100 | 0 | ∅ | $\overline{S4}$ | $\overline{4}$ |
| t=2 | 1100 | 01 | S2 | S4 | 4 |
| t=3 | 100 | 011 | S2 | S4 | 4 |
| t=4 | 00 | 0111 | S2 | S4 | 4 |
| t=5 | 0 | 01111 | ∅ | $\overline{S4}$ | $\overline{4}$ |
| t=6 | | 011111 | S3 | S4 | 4 |
| t=7 | | 111110 | S3 | S4 | 4 |
| | | 111101 | S3 | S4 | 4 |
| | | 111011 | S3 | S4 | 4 |
| | | 110111 | S3 | S3 | 3 |

P = 5 IN MEMORY CIRCUIT 75
∅ = INVALID N-BIT WORD IN REGISTER 45 e.g., $\overline{S4}$ INDICATES START OF A LATCHED OPERATION

FIG. 11

POSSIBLE TRANSIENT SEQUENCES IN
SWITCHING FROM SIGNALING STATE S4 TO S3

| SIGNALING STATES | TRANSMITTED CODE WORDS | | LOGIC CIRCUIT 55 OUTPUT SEQUENCE SIGNALING INTERVAL | | | | | | | | LATCH CIRCUIT 65 OUTPUT SEQUENCE | | | | | | | | | | |
|---|---|---|---|---|---|---|---|---|---|---|---|---|---|---|---|---|---|---|---|---|---|
| | S4 | S31 | t=0 | 1 | 2 | 3 | 4 | 5 | 6 | 7 | t=0 | 1 | 2 | 3 | 4 | 5 | 6 | 7 | 8 | 9 | 10 |
| S41 S31 | 101100 | 011111 | S4 | ∅ | 2 | 2 | 2 | ∅ | 3 | etc. | S4 | $\overline{4}$ | 4 | 4 | 4 | $\overline{4}$ | 4 | 4 | 4 | 4 | 3 |
| S42 S31 | 011001 | 011111 | S4 | 4 | 4 | 4 | ∅ | 3 | 3 | etc. | S4 | 4 | 4 | 4 | $\overline{4}$ | 4 | 4 | 4 | 4 | 3 | 3 |
| S43 S31 | 110010 | 011111 | S4 | ∅ | ∅ | 5 | ∅ | ∅ | 3 | etc. | S4 | $\overline{4}$ | 4 | 4 | $\overline{4}$ | $\overline{4}$ | 4 | 4 | 4 | 4 | 3 |
| S44 S31 | 100101 | 011111 | S4 | ∅ | ∅ | ∅ | ∅ | 3 | 3 | etc. | S4 | $\overline{4}$ | $\overline{4}$ | $\overline{4}$ | $\overline{4}$ | 4 | 4 | 4 | 4 | 3 | 3 |
| S45 S31 | 001011 | 011111 | S4 | 4 | ∅ | ∅ | 3 | 3 | 3 | etc. | S4 | 4 | $\overline{4}$ | $\overline{4}$ | 4 | 4 | 4 | 4 | 3 | 3 | 3 |
| S46 S31 | 010110 | 011111 | S4 | 4 | 4 | ∅ | ∅ | ∅ | 3 | etc. | S4 | 4 | 4 | $\overline{4}$ | $\overline{4}$ | $\overline{4}$ | 4 | 4 | 4 | 4 | 3 |

P = 5 IN. MEMORY CIRCUIT 75
∅ = INVALID N-BIT WORD IN REGISTER 45 e.g., $\overline{4}$ = $\overline{S4}$ INDICATES START OF A LATCHED OPERATION

FIG. 12

ASYNCHRONOUS SIGNALING SYSTEM FOR DIGITAL COMMUNICATION CHANNEL

BACKGROUND OF THE INVENTION

This invention relates to apparatus for performing signaling functions in a digital communication system and more particularly to improved apparatus for performing asynchronous signaling in a digital communication channel.

The conventional method of communicating signaling information in a synchronous communication link or channel is to multiplex bits of a signaling word with channel information bits with due regard to the framing format. With synchronous signaling techniques the equipment defines when a signaling word is allowed to start and thus an inherent variable delay occurs between the time a random change to a different signaling message is desired and the time when it is completely received. Asynchronous signaling techniques, however, convey signaling messages at times that are not predictable, i.e., the receiver has no knowledge as to when a signaling word will start. Also since there is no transmission of any signaling information until a different signaling message is to be transmitted, failure of the asynchronous communication system can occur without the system being aware of this failure.

An object of this invention is the provision of improved apparatus for performing asynchronous signaling.

Another object is the provision of improved apparatus which continuously transmits digital signaling words and makes decisions as to the transmitted signaling word for each bit of signaling information and which does not require information as to the start or stop of a particular signaling word.

SUMMARY OF INVENTION

In accordance with this invention apparatus for performing asynchronous signaling in a digital communications system including transmitter and receiver equipment for multiplexing and demultiplexing digital signaling information signals and digital traffic information signals, each of the signaling information signals defining a different one of a plurality of signaling states S1-SM, comprises means for storing a plurality of M unique N-bit primary digital code words Sm1 each defining a different one of the signal states S1-SM and each having N-1 additional ordered permutations of the order of the N-bits thereof, with the additional ordered permutations being designated as secondary code words; first means responsive to a particular status/control input signal for causing the storing means to serially produce an output signal comprising serial bits B1-BN of one of the primary and secondary code words for a particular signaling state Ss at a signaling clock rate; means for multiplexing the serially produced bits from the storing means with traffic information bits at signaling time slots in a bit stream when the signaling time slots occurring at the signaling clock rate; means for transmitting the multiplexed bit stream to receiver equipment; means for extracting a signaling clock signal from the multiplexed bit stream in the receiver equipment; means for demultiplexing the multiplexed bit stream in the receiver equipment for producing a stream of serial signaling bits; and means for producing during each signaling bit interval a first indication that the transmitted signaling state is a prescribed signaling state Sp when there is a match between the most recently received N signaling bits of the serial signaling bit stream and one of the N-bit primary and secondary code words associated with the prescribed signaling state Sp; and producing a second indication when there is not a match between the most recently received N signaling bits of the serial signaling bit stream and any of the primary and secondary code words.

DESCRIPTION OF THE DRAWINGS

FIG. 11 is a tabulation illustrating the operation of the decoder 55, latch 65 and integrator 75 in FIG. 9 for the converter 23 switching from transmitting an S41 to an S31 code word at the end of S41.

FIG. 12 is a tabulation illustrating the operation of the decoder 55, latch 65 and integrator 75 in FIG. 9 for the possible transient sequences that may occur in switching from transmitting an S4 to an S3 signaling state.

DESCRIPTION OF PREFERRED EMBODIMENTS

It is known that N-binary bits map out $2^N$ digital N-bit words. Although each of these N-bit words is different only some of them are unique such that cyclically changing the order of the bits of one unique word will not produce a different unique word. Stated differently, each adjacent N-bits out of two identical back-to-back N-bit words that define the same unique word will not define a different unique word. Rather the N-bit words, called code words, from the back-to-back pair thereof are ordered permutations of the same ordered group of N-bits where one of them is called a primary code word that is identified with the unique word and the others are called secondary code words. By way of example, for $N=2$, the $2^N=4$ two bit digital code words are $A=00$, $B=01$, $C=10$ and $D=11$. Two pairs of these words taken back-to-back are AA=0000 and DD=1111. Considering these pairs of code words 2-bits at a time (e.g., with a 2-bit window that moves from left to right) it is seen that both 00 and 11 are unique and primary code words since permutations thereof do not produce other ones of the code words of A–D. Considering pairs of the other two code words (BB=0101 and CC=1010) with the 2-bit moving window, however, reveals that 01 and 10 are ordered permutations of the same unique code word. Thus, only one of these digital words B and C can be considered to be a unique digital word. By way of example, B is the unique state or word with 01 being the primary code word and 10 being the secondary code word. It can be readily determined that for N=5 that there are 8 unique states, 6 of which have 5 entirely different permutations. Similarly, for N=6 there are only 14 unique states, with 9 of them each having 6 entirely different permutations.

Figure 1:
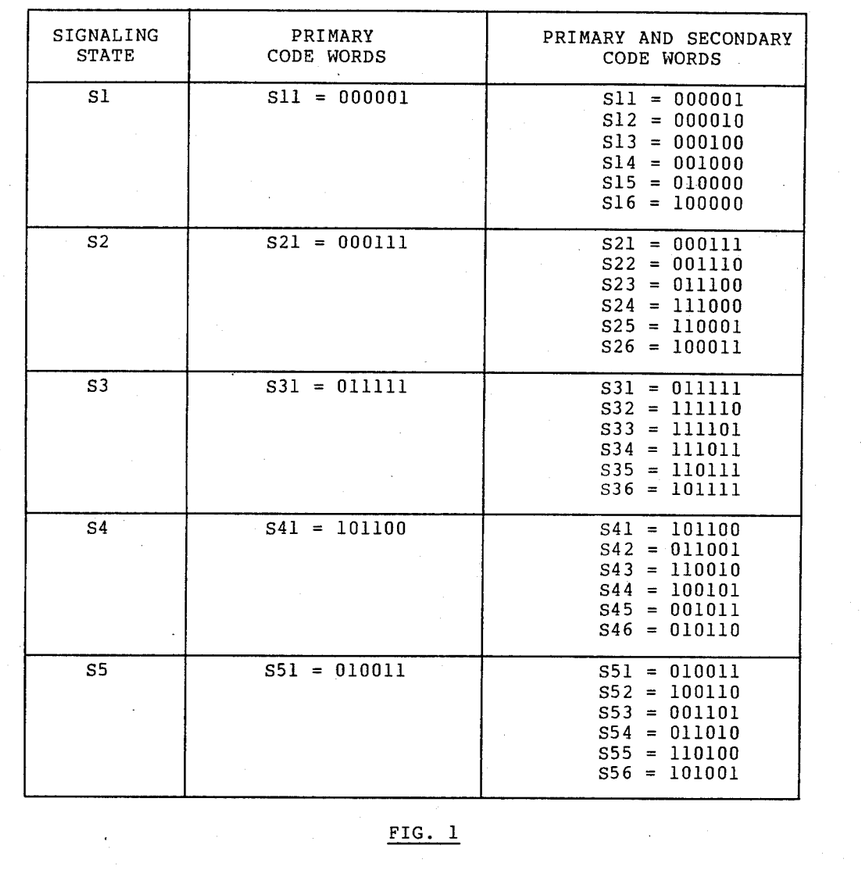
FIG. 1 is a tabulation of signaling states and associated digital code words.

FIG. 1 is a tabulation of 5 unique signaling states S1–S5 which are defined by associated N=6 bit primary code words S11–S51 in column 2. There are 6 different ordered permutations of each of these primary code words. The ordered permutated code words are defined in column 3 by legends where the first and second numbers following the letter S describe the particular signaling state (or unique word) and an associated ordered permutation, respectively. The code words in which the second number is a 1 are referred to as primary code words. The code words in which the second numeral is other than a 1 are referred to as secondary code words.

In regard to FIG. 1 the number of possible signaling states and the number of signaling bits thereof are dependent on the degree of error protection or robustness required in the system. The technique can be optimized for minimum transition to transition differential delay for applications where pulse distortion is undesirable. More specifically, the signaling code words are chosen so that in cases where a constant reaction time is desired when switching between two states, e.g., to conserve symmetry so as to minimize pulse distortion, then approximately the same number of signaling bit intervals occur before a transition is complete when changing from state X to state Y as occur when changing from state Y to state X. This will be illustrated subsequently by the tabulations in FIGS. 5 and 6. Additionally, adjacent signaling words are chosen so that hybrid words or combinations of N-bits of two adjacent code words which occur during any possible transition preferably are not the same as other defined code words and are therefore to be decoded as invalid states. And for the code words illustrated in FIG. 1 the 6 bits representing the signaling states are chosen to have Hamming distances of two, so that signal errors will preferably not cause an indication of unintended signaling states, where the Hamming distance is the number of digital positions in which the corresponding digits of two binary words of the same length are different.

Figures 2, 3, 9:
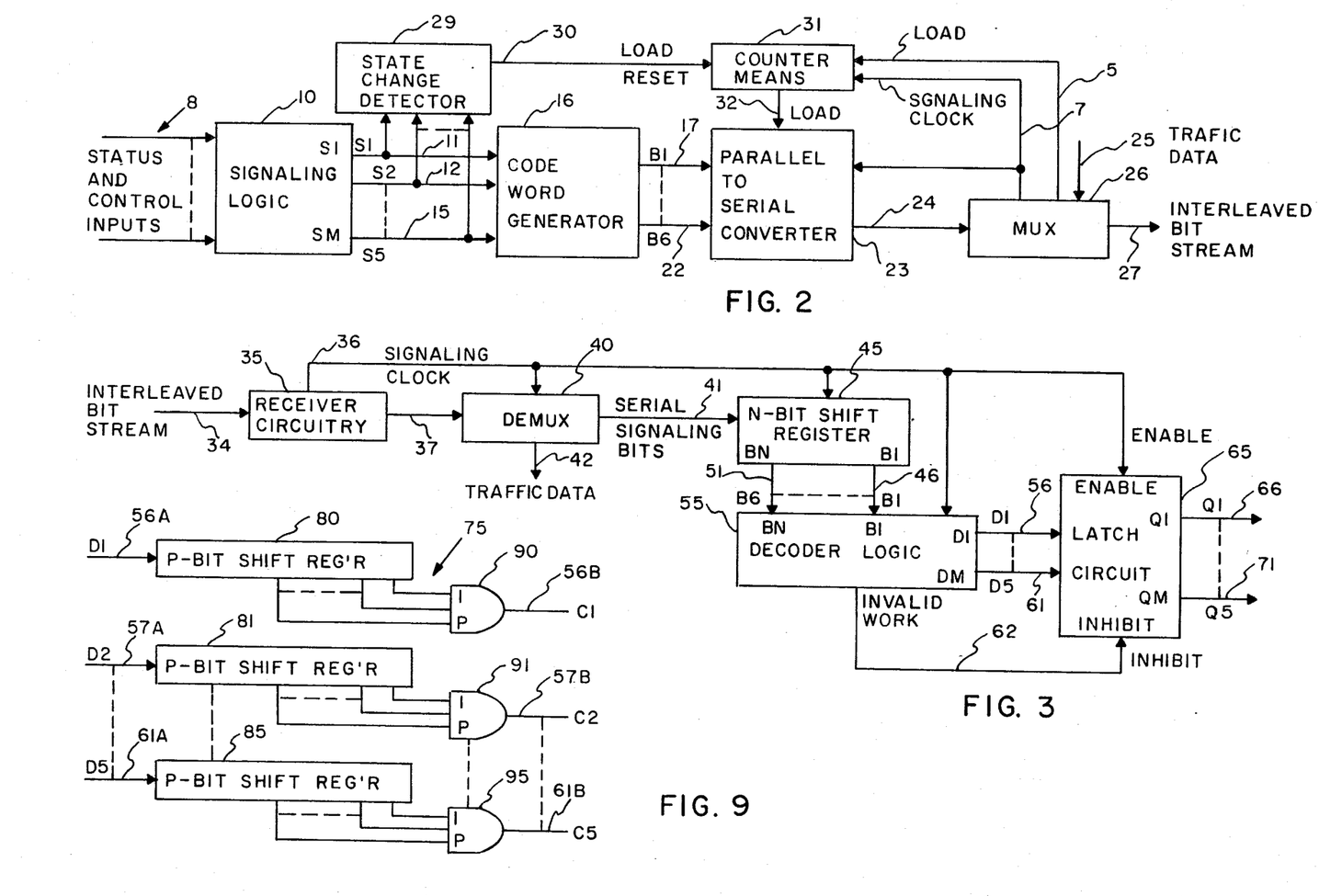
FIG. 2 is a schematic block diagram of a transmitter of a digital communication system embodying this invention.
FIG. 3 is a schematic block diagram of a receiver in a digital communication system embodying this invention.
FIG. 9 is a schematic block diagram of an alternate embodiment of this invention.

A digital communication system for practicing this invention generally comprises transmitter and receiver circuitry that is illustrated in FIGS. 2 and 3, respectively. Signaling equipment in the transmitter includes a signaling logic circuit 10, a code word generator 16, and a parallel to serial converter 23. Serial signaling bits on line 24 from the converter are multiplexed with data-information bits on line 25 in the conventional manner in the circuit 26 and transmitted to receiver circuitry such as by radio, cable or a satellite system. Signaling circuitry in the receiver equipment comprises circuitry 35 for extracting signaling clock information from the multiplexed bit stream on line 34, a demultiplexer circuit 40 for extracting signaling bits from the multiplexed data stream, an N-bit serial shift register 45 that receives the serial signaling bits on line 41 and has N output lines which drive decoder logic circuit 55, and a latch circuit 65 that is driven by outputs of the decoder logic.

In operation, transmitter equipment (not shown) applies signaling and/or control type information to logic circuit 10 and generates a traffic-data signal on line 25 in the conventional manner. In a satellite pulse code modulation (PCM) communication system embodying this invention that was built and satisfactorily operated each frame was made up of 100 bits with the 26th and 76th bits thereof carrying signaling information. The first bit of each frame was a framing synchronization bit. The system had a 33⅓ KBPS pulse rate. The signal on line 25 was a 32 KBPS encoded digitized voice signal. No special consideration of the signaling format is required other than to insure that signaling bits not simulate the framing bit sequence.

The logic circuit 10 is operative for continuously producing a binary 1 on a selected one of the lines 11–15 for indicating that the current status and control type information on lines 8 corresponds to an assigned one of the signaling states S1–S5 in FIG. 1. The signaling states S1–S5 may by way of example correspond to signaling conditions of ring received, network seizure, reverse battery, loop-back, and no input activity. Thus, in this example the equipment in FIG. 2 is at a central office.

The generator 16 is responsive to a binary 1 on the selected one of the lines 11–15 for continuously producing an associated N=6 bit primary code word on lines 17–22, i.e., it is present on lines 17–22 during each signaling bit interval. In a preferred embodiment the generator 16 comprises a memory such as an EPROM containing look-up tables storing the primary code words S11–S51. The code word on lines 17–22 changes whenever there is a change in the signaling state from logic circuit 10. The counter means 31 is periodically incremented by signaling clock pulses on line 7 and is selectively triggered by a framing pulse (e.g., at the first bit of each frame) on line 5 for producing a load pulse on line 32. More specifically, circuit 31 is responsive to the framing pulse on line 5 that follows every sixth signaling clock pulse on line 7 for producing a control pulse on line 32 which enables converter 23 to sample the code word on lines 17–22. The converter 23 is conventional and operates at the signaling clock rate for reading out the 6 bits stored therein as a serial bit stream on line 24 with the bit B1 being outputted on line 24 prior to the bit BN=B6. The multiplexer 26 interleaves the signaling bits with data bits on line 25 in the conventional manner to form the interleaved bit stream on line 27 which is transmitted to receiver equipment.

As will be apparent from the following description, the specific application in which this signaling technique is used may impact on the selection of particular code words and the manner in which the transmitter changes from outputting one signaling code word on line 24 to outputting another signaling code word there. More specifically it is up to the system designer to determine how the converter 23 will respond to a change in the signaling state from logic circuit 10. The cleanest method of transmission is to have converter 23 output all N=6 bits of a primary code word onto line 24 before converter 23 samples the next primary code word on lines 17-22, i.e., to transmit a different signaling state only at the end of a group of 6 signaling clock pulses on line 7. This is readily accomplished by making the detector 29 insensitive to a change of signaling state on the output of logic circuit 10. Detector 29 will therefore have no effect on the operation of counter means 31. It may be desirable in some instances to immediately change from transmitting one primary code word to another primary code word in order to save time. This is readily accomplished with circuit 29 which detects a change in signaling state on lines 11-15 and produces a control pulse on line 30. This causes circuit 31 to produce a load pulse which enables converter 23 to immediately start outputting the new code word. Alternatively, circuit 29 can operate for causing the converter to immediately change to transmit a new code word for only some signaling states.

The receiver circuit 35 in FIG. 3 extracts the signaling clock from the multiplexed bit stream 34 which is then passed on line 37 to demultiplexer 40. The circuit 40 separates the serial signaling bits from the data stream for producing a continuous stream of signaling bits on line 41 at the signaling clock rate. The signaling bits are shifted through register 45 at the signaling bit rate, with an indication of the oldest and most recent signaling bits in register 45 being available on lines 46 and 51, respectively.

The decoder logic 55 includes a memory which stores all of the code words that can be produced by generator 16 and all of the ordered permutations thereof. These stored code words are called valid or allowable states or allowable code words and may by way of example correspond to the group of code words in FIG. 1. Thus, if there are M states that are each identified by an N-bit word then there are normally MN possible valid code words or valid ordered combinations of signaling bits. The circuit 55 is operative for determining whether the current N bit word in register 45 is one of the allowable code words or is an invalid word which does not correspond to an allowable state. When the contents of register 45 corresponds to a valid code word the decoder circuit 55 produces a binary 1 on a selected one of the output lines 56-61 and a binary 0 on the other of the lines 56-61 and 62. Conversely, when the contents of register 45 corresponds to an invalid code word the decoder logic produces a binary 0 on lines 56-61 and a binary 1 on the output line 62.

The latch circuit 65 is periodically enabled by the signaling clock for reading the output signals D1-D5 from the decoder 55. If a current one of the output signals D1-D5 is high, then the associated one of the output signals Q1-Q5 also goes high to indicate that the current transmitted code word corresponds to a selected one of the signaling states S1-S5, respectively. If the decoder output signal on line 62 is high (for indicating that the current contents of register 45 corresponds to an invalid code word), however, latch circuit 65 is inhibited from reading the output signals D1-D5 (which are all low at this time). Instead the latch makes the one of the output signals Q1-Q5 thereof high that was previously high for indicating that the current transmitted code word is the same as the transmitted code word occurring during the previous N signaling time intervals. Thus, the last valid input state from the decoder 55 is latched at the output of the latch circuit 65 whenever an invalid word is indicated on line 62. This state could be caused by errored bits or by transient states or combinations of bits that occur when the transmitter changes state. The latch circuit will also latch up to produce the previous output signal thereof when the logic levels on all of the lines 56-62 are low. With this receiver process the signaling integrity is enhanced by essentially precluding incorrect changes in the latched signaling output state unless two or more errors of the basic signaling block repeat consistently.

Figure 4:
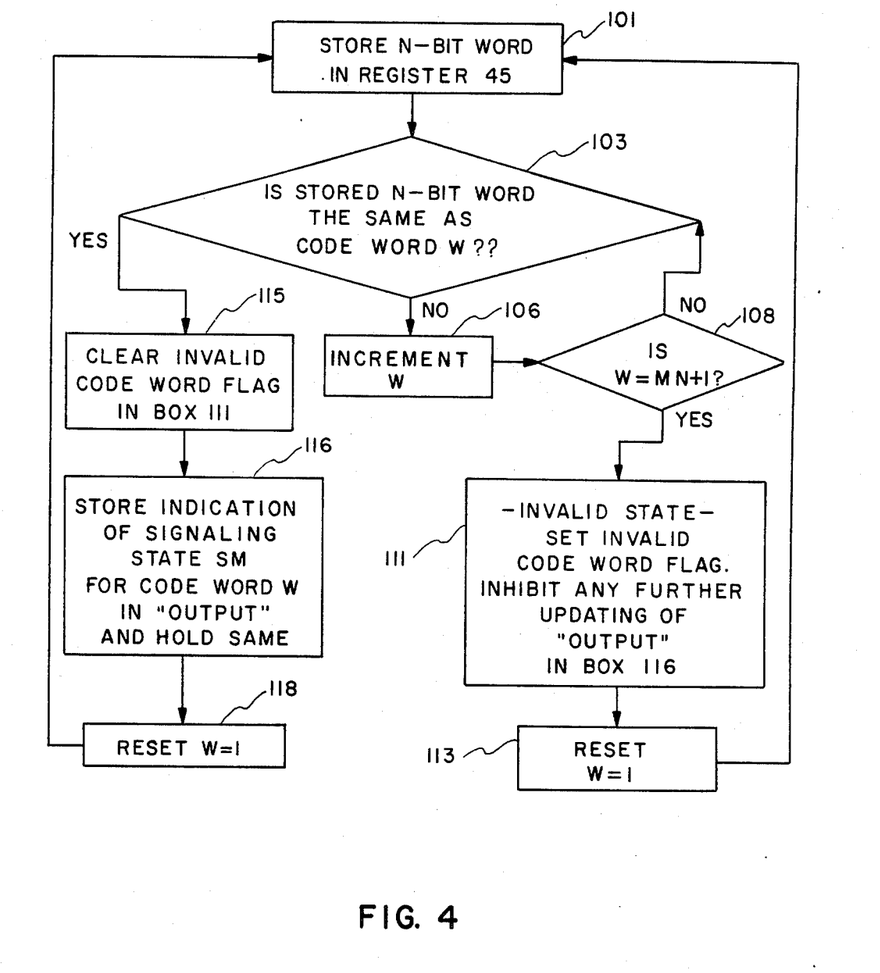
FIG. 4 is a flow diagram for a microcomputer embodiment of decoder 55 and latch circuit 65 in FIG. 3.

The shift register 45, decoder circuit 55 and latch circuit 65 may be a custom designed circuit, be implemented with discrete logic elements or be implemented with digital computer circuitry. In a preferred embodiment of this invention that was built and operated the register 45, decoder 55 and latch circuit 65 were all implemented on a Model 8039 microcomputer manufactured by Intel corporation which was also utilized for performing other functions in the digital communication system. A flow chart defining the software program for making the microcomputer perform the prescribed functions of the decoder 55 and latch circuit 65 is shown in FIG. 4. The loop defined by boxes 103-108 in FIG. 4 is repeated continuously for each signaling bit interval, until it exits to either step 111 or step 115.

Figure 5:
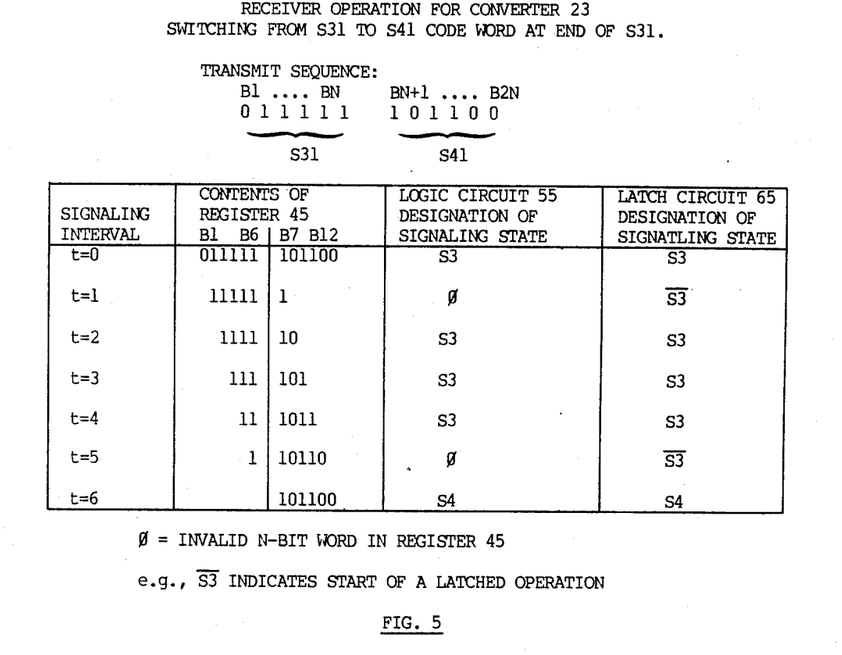
FIG. 5 is a tabulation illustrating the operation of the decoder 55 and latch 65 in FIG. 3 for the converter 23 switching from transmitting an S31 to an S41 code word at the end of S31.

It is clear that if generator 16 continuously produces the same primary code word on lines 17-22 then the output of latch circuit 65 will indicate the same code word for each sampling interval, assuming there are no errors in transmission such as are caused by noise. It can readily be seen, however, that different combinations of bits will occur during the N-bits following a transition between signaling states, i.e., after converter 23 stops outputting one primary code word and starts a different primary code word. The tabulation in FIG. 5 illustrates the operation of decoder circuit 55 and latch 65 in FIG. 3 when converter 23 changes from transmitting a primary code word S31 to outputting a primary code word S41 at the end of transmission of the code word S31 by converter 23, i.e., after a group of six signaling clock pulses on line 7. The second column in FIG. 5 is essentially what is seen by viewing row 1 of column 2 with a moving 6 bit window that moves from left to right by one bit for each signaling interval. More specifically, at signaling time interval t=1 the decoder 55 tries to match the contents of register 45, consisting of one bit of the new word S41 and N−1 bits of previous code word S31, to its repertoire of valid signaling code words. During the next signaling bit interval at t=2, the decoder 55 tries to match the N-bit word comprising the first two bits of the new code word S41 and N-2 bits of the previous code word S31 with the valid code words that are stored thereby. This operation is repeated during each signal bit with the N-bit window advanced in this manner during each signalling bit interval. Column 3 reveals that at signaling times t=1 and t=5 the contents of register 45 correspond to an invalid code word (represented by the symbol $\phi$) such that the latch 65 repeats the previous output thereof for indicating that there has not yet been a change in the signaling state at the transmitter. In this instance it is only after receipt of the new primary code word in register 45 that latch 65 indicates that a code word designating the signaling state S4 is now being transmitted.

Figure 6:
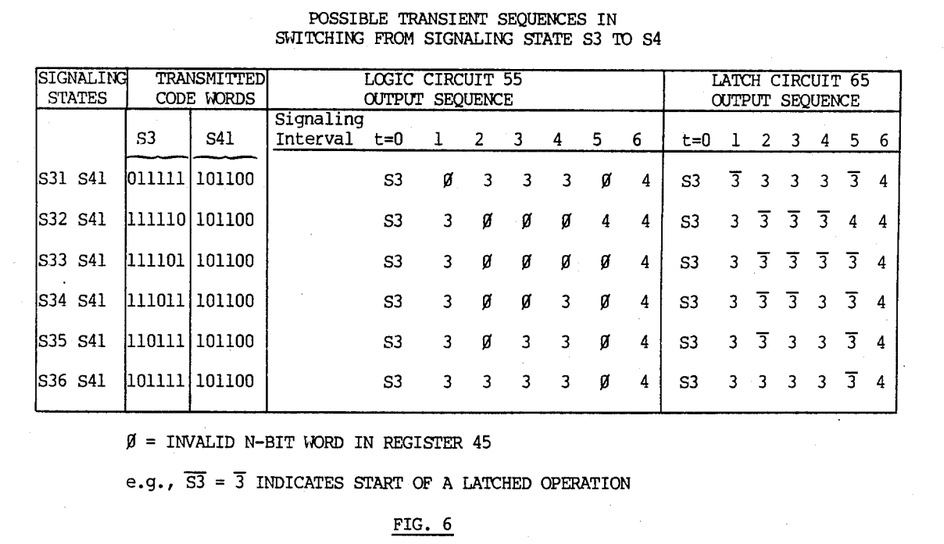
FIG. 6 is a tabulation illustrating the operation of the decoder 55 and latch 65 in FIG. 3 for the possible transient sequences that may occur in switching from transmitting an S3 to an S4 signaling state.

Each row of the tabulation in FIG. 6 illustrates an operation similar to that in FIG. 5 where the converter 23 is caused to change from outputting the primary code word S31 to outputting the new primary code word S41 for the signaling state S4 during different time slots. Stated differently, FIG. 6 illustrates the operation of the decoder 55 and latch 65 in FIG. 3 when converter 23 terminates generation of the primary code word S31 after only shifting some of the bits of the code word S31 through it prior to its sampling and abruptly switching operation to outputting the new primary code word S41.

Figure 7:
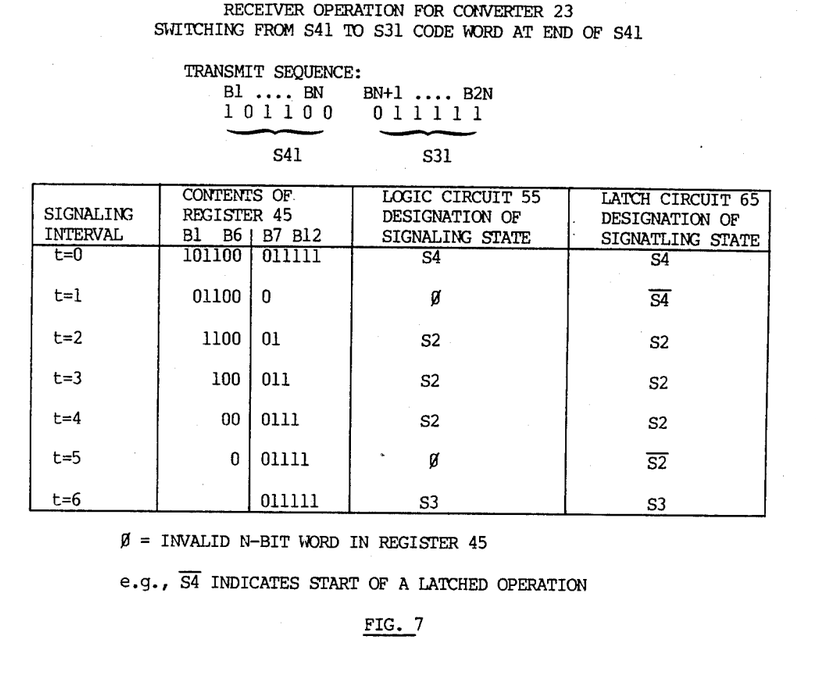
FIG. 7 is a tabulation illustrating the operation of the decoder 55 and latch 65 in FIG. 3 for the converter 23 switching from transmitting an S41 to an S31 code word at the end of S41.
Figure 8:
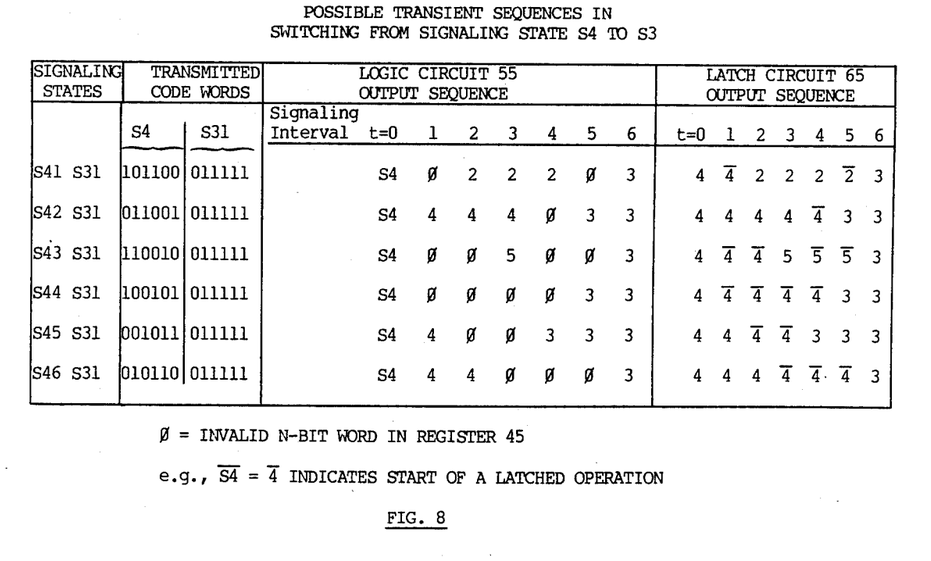
FIG. 8 is a tabulation illustrating the operation of the decoder 55 and latch 65 in FIG. 3 for the possible transient sequences that may occur in switching from transmitting an S4 to an S3 signaling state.

The tabulations in FIGS. 7 and 8 illustrate similar operations of the decoder 55 and latch 65 in FIG. 3 when generator 16 switches or moves in the opposite direction for switching from transmitting the primary code word S41 to outputting the primary code S31 on lines 17–22. In this instance it will be noted that the incorrect but valid code word S2 is recognized by the decoder and outputted by the latch circuit at times t = 2 and t = 5 in FIG. 7. Additionally the incorrect but valid code word for signaling state S5 can be recognized by decoder 55 and passed by the latch circuit 65 in FIG. 3 for the back-to-back signaling states S43 and S31 in row 3 of the tabulation in FIG. 8. It is desirable therefore that primary code words be chosen such that groups of N = 6 bits out of pairs of code words will not make up hybrid words defining valid but incorrect signaling states that are the same as these and other primary control words or ordered permutations thereof during all possible transitions between signaling states. Such a selection of primary code words will of course depend on the particular application for this signaling techniques. In an application where minimum asymmetry is desired the appearance of a signaling state S2 in FIG. 8 would be defined as an invalid state thus demonstrating the flexibility of the technique. This can be accomplished with an integrator circuit as is described more fully hereinafter or with programming in a software implementation of the decoder 55. Comparison of the tabulations in FIGS. 6 and 8 also reveals that the output of decoder 55 changes state after 5 or 6 signaling intervals for a state S3 to a stated S4 transition whereas it changes state after 5, 6 or 7 intervals for a state S4 to a state S3 transition (assuming the indication of a signaling state S2 is invalid). Thus, the worst case asymmetry provided in this example is 2 signaling bit intervals.

Figure 10:
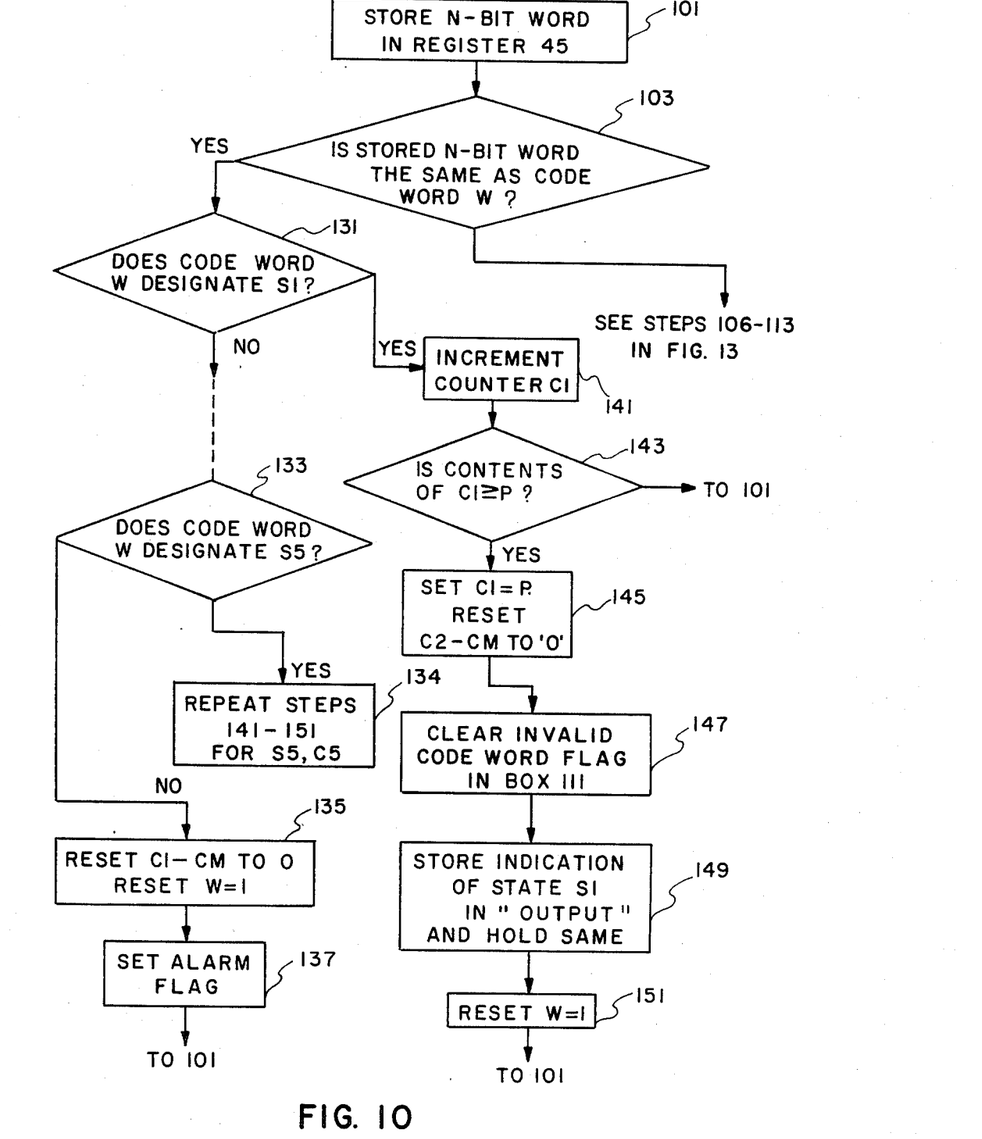
FIG. 10 is a flow diagram for a microcomputer implementation of the decoder logic 55 and latch circuit 65 together with the integrator 75 in FIG. 9.

An alternate embodiment of this invention that overcomes the aforementioned problems is illustrated in FIG. 9 and comprises an integrator type of memory device 75 that is inserted between the decoder logic 55 and the latch circuit 65 for effectively isolating the latch circuit from false indications of transmitted signaling states that may be produced by the decoder logic. The integrator circuit 75 essentially causes the latch circuit 65 to produce an output indicating that the transmitted code word in the register 45 is the same as the previously transmitted code word for at least P consecutive signaling bit intervals following receipt of an invalid code word. With the memory circuit 75 a change of state at the output of the latch will only occur if P consecutive groups of N signaling bits are each decoded as the same new valid code word or signaling state. More specifically, the same output of decoder 55 must be maintained throughout P consecutive signaling time slots to enable an associated AND-gate and trigger the latch circuit 65 so as to produce a new output signal on a different one of the output lines 66–71 of the latch circuit. A flow chart for implementing the functions of the FIG. 9 circuit on the microcomputer is shown in FIG. 10. The tabulations in FIGS. 11 and 12 illustrate the operation of the decoder 55, integrator 75, and latch 65 for these same combinations of or sequences of code words as are illustrated in FIGS. 7 and 8 when the memory circuit or integrator 75 is connected in series in the lines 56–61 with P = 5. In these instances it is seen that although the decoder circuit 55 correctly recognizes the code words for incorrect but valid signaling states S2 and S5, the memory circuit 75 requires the latch circuit 65 to continue to produce an output indicating that the current transmitted signaling state has not yet changed. Thus, a change of state from a latched output signaling state will only occur if N consecutive signaling bits are decoded as a consistent valid state for P consecutive signaling bit intervals. The circuit 75 merely introduces a delay of P signaling clock intervals before a new signaling state is indicated at the output of the latch circuit. This delay may be varied for improving the integrity or reliability or non-susceptibility of the system to noise.

Errored bits cause a delay in the latch output refresh if the error occurs during a period of unchanging transmitter state; or a delay in the change of state from the latch outputs if the error occurs during a transmitter change of state sequence. The effect should be at worst a distortion of N-bit intervals in the timing of the receiver output change, but an incorrect received output state cannot occur unless enough errors occur to exceed the Hamming distance of the transmit words. So, identical double error pairs that are separated by N signaling bit intervals are necessary to cause a decoder output error.

Stated differently, if a signaling bit is received in error the decoder logic will register an "Invalid Word" while the errored bit is shifted through the Receive Shift Register, unless the error causes another valid word to be simulated. The probability of this happening depends on the choice of transmitted words. If they are chosen to have a minimum Hamming distance of H, then H or fewer errors in any N contiguous bits received will not simulate another transmitted state but will cause the latching circuit to freeze its output for N-bit intervals. This action can cause delay during a change of signaling state, but should not cause unintended receiver output states. If H bits or more are in error in N contiguous bits, the probability of simulating another valid word can be calculated from an analysis of the various ways that the errors can occur and the repertoire of valid received words.

Although this invention is described in relation to preferred embodiments thereof, variations and modifications are possible. By way of example, the traffic may be digitized voice in a PCM system or pure data information. Also, the system can have different framing formats from what is described here. Additionally, the generator can output either primary or secondary code words. Further, the circuits 16, 23, 29 and 31 can also be implemented with a microcomputer. The scope of this invention is therefore to be determined from the attached claims rather than from the aforementioned detailed descriptions of preferred embodiments.

What is claimed is:

1. Apparatus for performing asynchronous signaling in a digital communications system including transmitter and receiver equipment for multiplexing and demultiplexing digital signaling information signals and digital traffic information signals, each of said signaling information signals defining a different one of a plurality of signaling states S1–SM, said apparatus comprising:

means for storing a plurality of M unique N-bit primary digital code words Sm1 each defining a different one of the signal states S1–SM and each having N−1 additional ordered permutations of the order of the N-bits thereof, said additional ordered permutations being designated as secondary code words;

first means responsive to a particular status/control input signal for causing said storing means to serially produce an output signal comprising serial bits B1–BN of one of the primary and secondary code words for a particular signaling state Ss at a signaling clock rate;

means for multiplexing the serially produced bits from said storing means with traffic information bits at signaling time slots in a bit stream, said signaling time slots occurring at the signaling clock rate;

means for transmitting the multiplexed bit stream to receiver equipment;

means for extracting a signaling clock signal from the multiplexed bit stream in the receiver equipment;

means for demultiplexing the multiplexed bit stream in the receiver equipment for producing a stream of serial signaling bits; and means for producing during each signaling bit interval a first indication that the transmitted signaling state is a prescribed signaling state Sp when there is a match between the most recently received N signaling bits of the serial signaling bit stream and one of the N-bit primary and secondary code words associated with the prescribed signaling state Sp; and producing a second indication when there is not a match between the most recently received N signaling bits of the serial signaling bit stream and any of the primary and secondary code words.

2. Apparatus according to claim 1 wherein said storing means is responsive to the output of said first means for serially producing the N-bits of the primary code word Ss1 for the selected state Ss at the signaling clock rate.

3. Apparatus according to claim 2 further comprising means operative during each signaling bit interval for passing said first indication when it is present and being responsive to the presence of a second indication for passing the preceeding first indication as the receiver equipments designation of the transmitted signaling state.

4. Apparatus according to claim 3 wherein said passing means comprises a latch means passing said first indication as the receiver equipment's designation of the transmitted signaling state when it is present, said latch means being latched by a second indication so as to be operative to pass the most recently passed first indication of a match between N consecutive signaling bits of the serial bit stream and any of said code words as the receiver equipment's designation of the transmitted signaling state.

5. Apparatus according to claim 4 wherein said latching means is unlatched whenever there is a match between the most recent N signaling bits of the stream thereof and any of the code words.

6. Apparatus according to claim 5 further comprising means for integrating first indications from said producing means in successive signaling bit intervals, said integrating means requiring the presence of a first indication designating the same signaling state during P consecutive signaling bit intervals before it will generate an output that is a third indication of said same signaling state, said latching means being responsive to the absence of a third indication during a signaling bit interval for being latched so as to pass the third indication produced during the most recent signaling bit interval as the receiver's designation of the transmitted signaling state whereby changing the designation to a different signaling state occurs only after there is a match between P consecutive groups of N signaling bits and code words designating the same signaling state.

7. Apparatus according to claim 6 wherein there is an absence of a third indication on the output of said integrating means whenever there is not a match between the most recent N signaling bits and any code word.

8. Apparatus according to claim 6 wherein there is an absence of a third indication on the output of said integrating means whenever there is a match between the most recent N significant bits and a code word corresponding to a signaling state that is different from the most recently recognized signaling state.

9. Apparatus according to claim 6 wherein said storing means and first means are operative for changing from producing the ordered N bits of the one primary code word for one selected signaling state on the output of said storing means to producing the ordered N-bits of another primary code word for a different selected signaling state only after said storing means serially outputs all of the N-bits for the primary code word.

10. Apparatus according to claim 6 wherein said storing means and first means are operative for changing from producing the ordered N bits of the one primary code word for one selected signaling state on the output of said storing means to producing the ordered N-bits of another primary code word for a different selected signaling state during any signaling bit interval for only some specified signaling states.

11. Apparatus according to claim 6 wherein said storing means and first means are operative for changing from producing the ordered N bits of the one primary code word for one selected signaling state on the output of said storing means to producing the ordered N-bits of another primary code word for a different selected signaling state during any signaling bit interval for any signaling state.

* * * * *